(12) United States Patent
Albrecht et al.

(10) Patent No.: US 10,875,116 B2
(45) Date of Patent: Dec. 29, 2020

(54) ADDITIVE MANUFACTURING HEATING CONTROL SYSTEMS AND METHODS

(71) Applicant: ILLINOIS TOOL WORKS INC., Glenview, IL (US)

(72) Inventors: Bruce Patrick Albrecht, Neenah, WI (US); Christopher Hsu, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 118 days.

(21) Appl. No.: 14/330,845

(22) Filed: Jul. 14, 2014

(65) Prior Publication Data
US 2015/0021815 A1 Jan. 22, 2015

Related U.S. Application Data

(60) Provisional application No. 61/846,935, filed on Jul. 16, 2013.

(51) Int. Cl.
*B23K 9/04* (2006.01)
*B23K 9/23* (2006.01)
(Continued)

(52) U.S. Cl.
CPC ............. *B23K 9/04* (2013.01); *B05B 5/001* (2013.01); *B05B 5/0255* (2013.01); *B05B 7/22* (2013.01); *B05B 12/18* (2018.02); *B22F 3/008* (2013.01); *B22F 3/1055* (2013.01); *B22F 3/115* (2013.01); *B22F 7/064* (2013.01); *B23K 9/02* (2013.01); *B23K 9/23* (2013.01); *B23K 9/232* (2013.01);
(Continued)

(58) Field of Classification Search
None
See application file for complete search history.

(56) References Cited

U.S. PATENT DOCUMENTS 2,191,471 A 2/1940 Hopkins
3,141,085 A 7/1964 Manz
(Continued)

FOREIGN PATENT DOCUMENTS

CA 2560290 11/2013
CN 1053760 8/1991
(Continued)

OTHER PUBLICATIONS

International Search Report from PCT application No. PCT/US2014/046568, dated Dec. 5, 2014, 12 pgs.
(Continued)

*Primary Examiner* — Devang R Patel
(74) *Attorney, Agent, or Firm* — McAndrews, Held & Malloy, Ltd.

(57) ABSTRACT

An additive manufacturing system includes an additive manufacturing tool configured to supply a plurality of droplets to a part, a temperature control device configured to control a temperature of the part, and a controller configured to control the composition, formation, and application of each droplet to the plurality of droplets to the part independent from control of the temperature of the part via the temperature control device. The plurality of droplets is configured to build up the part. Each droplet of the plurality of droplets includes at least one metallic anchoring material.

17 Claims, 5 Drawing Sheets

(51) Int. Cl.

| | |
|---|---|
| *B33Y 10/00* | (2015.01) |
| *B33Y 30/00* | (2015.01) |
| *B05B 12/18* | (2018.01) |
| *B29C 64/112* | (2017.01) |
| *C23C 4/131* | (2016.01) |
| *B22F 7/06* | (2006.01) |
| *B23K 9/02* | (2006.01) |
| *B05B 7/22* | (2006.01) |
| *B22F 3/00* | (2006.01) |
| *B22F 3/115* | (2006.01) |
| *B05B 5/00* | (2006.01) |
| *B29C 64/40* | (2017.01) |
| *B33Y 50/02* | (2015.01) |
| *B05B 5/025* | (2006.01) |
| *B22F 3/105* | (2006.01) |
| *B23K 20/00* | (2006.01) |
| *B23K 31/02* | (2006.01) |
| *B23K 31/12* | (2006.01) |
| *B23K 103/02* | (2006.01) |
| *B23K 103/18* | (2006.01) |
| *B23K 103/04* | (2006.01) |
| *B05B 5/08* | (2006.01) |
| *B05B 7/18* | (2006.01) |
| *B23K 103/24* | (2006.01) |
| *B23K 103/20* | (2006.01) |

(52) U.S. Cl.
CPC .............. *B23K 20/00* (2013.01); *B23K 31/02* (2013.01); *B23K 31/12* (2013.01); *B29C 64/112* (2017.08); *B29C 64/40* (2017.08); *B33Y 30/00* (2014.12); *B33Y 50/02* (2014.12); *C23C 4/131* (2016.01); *B05B 5/081* (2013.01); *B05B 7/18* (2013.01); *B05B 7/224* (2013.01); *B05B 7/226* (2013.01); *B22F 2003/1056* (2013.01); *B22F 2003/1057* (2013.01); *B22F 2999/00* (2013.01); *B23K 2103/02* (2018.08); *B23K 2103/05* (2018.08); *B23K 2103/18* (2018.08); *B23K 2103/20* (2018.08); *B23K 2103/24* (2018.08); *B33Y 10/00* (2014.12); *Y02P 10/25* (2015.11)

(56) References Cited

U.S. PATENT DOCUMENTS

| | | | |
|---|---|---|---|
| 3,581,053 A | 5/1971 | Manz | |
| 3,912,980 A | 10/1975 | Crump | |
| 4,595,820 A | 6/1986 | Richardson | |
| 4,665,299 A | 5/1987 | Iwata | |
| 4,723,060 A | 2/1988 | Arnoldy | |
| 4,758,707 A | 7/1988 | Ogilvie | |
| 4,889,969 A | 12/1989 | Kawai | |
| 4,897,523 A | 1/1990 | Parks | |
| 5,148,001 A | 9/1992 | Stava | |
| 5,281,789 A | 1/1994 | Merz | |
| 6,023,046 A | 2/2000 | Holverson | |
| 6,051,810 A | 4/2000 | Stava | |
| 6,143,378 A * | 11/2000 | Harwell | C23C 26/02 427/264 |
| 6,149,072 A | 11/2000 | Tseng | |
| 6,248,976 B1 | 6/2001 | Blankenship | |
| 6,265,701 B1 | 7/2001 | Bickel | |
| 6,326,591 B1 | 12/2001 | Hutchinson | |
| 6,329,636 B1 | 12/2001 | Geissler | |
| 6,331,694 B1 | 12/2001 | Blankenship | |
| 6,405,095 B1 | 6/2002 | Jang | |
| 6,441,342 B1 | 8/2002 | Hsu | |
| 6,515,259 B1 | 2/2003 | Hsu | |
| 6,534,745 B1 | 3/2003 | Lowney | |
| 6,707,001 B1 | 3/2004 | Ulrich | |
| 6,800,832 B2 | 10/2004 | Hutchison | |
| 6,909,067 B2 | 6/2005 | Davidson | |
| 6,933,466 B2 | 8/2005 | Hutchison | |
| 6,963,048 B2 | 11/2005 | Huismann | |
| 6,969,823 B2 | 11/2005 | Huismann | |
| 6,974,931 B2 | 12/2005 | Holverson | |
| 6,984,806 B2 | 1/2006 | Huismann | |
| 7,129,443 B2 | 10/2006 | Davidson | |
| 7,165,707 B2 | 1/2007 | Huismann | |
| 7,304,269 B2 | 12/2007 | Fulmer | |
| 7,335,854 B2 | 2/2008 | Hutchison | |
| 7,572,403 B2 * | 8/2009 | Gu | B29C 41/36 156/356 |
| 8,373,094 B2 | 2/2013 | Wells | |
| 8,522,647 B1 | 9/2013 | Dixon | |
| 8,598,492 B2 | 12/2013 | Davidson | |
| 8,704,131 B2 | 4/2014 | Davidson | |
| 8,803,034 B2 | 8/2014 | Peters | |
| 8,901,453 B2 | 12/2014 | Miyagi | |
| 9,174,294 B2 | 11/2015 | Hutchison | |
| 9,314,865 B2 | 4/2016 | Davidson | |
| 9,902,018 B2 * | 2/2018 | Voice | B23K 26/1476 |
| 2001/0040153 A1 | 11/2001 | Lanouette | |
| 2003/0021251 A1 | 1/2003 | Moshiri-Tafreshi | |
| 2003/0058149 A1 | 3/2003 | Jayadeva | |
| 2003/0062355 A1 | 4/2003 | Ikegami | |
| 2003/0068518 A1 * | 4/2003 | Ando | B23K 9/04 428/608 |
| 2003/0201251 A1 | 10/2003 | Barbezat | |
| 2004/0206747 A1 | 10/2004 | Ito | |
| 2004/0234687 A1 | 11/2004 | Schmid | |
| 2005/0284599 A1 | 12/2005 | Grinberg | |
| 2006/0054079 A1 | 3/2006 | Withey | |
| 2006/0226137 A1 | 10/2006 | Huismann | |
| 2007/0000893 A1 | 1/2007 | Huismann | |
| 2007/0051711 A1 | 3/2007 | Kachline | |
| 2007/0102407 A1 | 5/2007 | Uezono | |
| 2007/0181547 A1 | 8/2007 | Vogel | |
| 2008/0087359 A1 * | 4/2008 | Zurecki | C23C 4/02 148/511 |
| 2008/0217314 A1 | 9/2008 | Wells | |
| 2008/0264917 A1 | 10/2008 | White | |
| 2009/0078689 A1 | 3/2009 | Brass | |
| 2009/0173726 A1 | 7/2009 | Davidson | |
| 2009/0242533 A1 * | 10/2009 | Yamazaki | B23K 9/0732 219/130.32 |
| 2009/0304943 A1 | 12/2009 | Gollob | |
| 2010/0140852 A1 * | 6/2010 | Kritchman | B33Y 30/00 264/494 |
| 2010/0176104 A1 | 7/2010 | Peters | |
| 2011/0061591 A1 * | 3/2011 | Stecker | B22F 3/1055 118/663 |
| 2011/0108527 A1 | 5/2011 | Peters | |
| 2011/0204034 A1 | 8/2011 | Schartner | |
| 2011/0288575 A1 | 11/2011 | Colton | |
| 2012/0067859 A1 | 3/2012 | Albrecht | |
| 2012/0097655 A1 | 4/2012 | Daniel | |
| 2012/0143491 A1 | 6/2012 | Cheng | |
| 2012/0209307 A1 | 8/2012 | Snijders | |
| 2012/0298642 A1 | 11/2012 | Lambert | |
| 2012/0325779 A1 | 12/2012 | Yelistratov | |
| 2013/0105447 A1 | 5/2013 | Haake | |
| 2013/0153557 A1 | 6/2013 | Pagano | |
| 2013/0309420 A1 | 11/2013 | Flesch | |
| 2014/0021183 A1 | 1/2014 | Peters | |
| 2014/0251971 A1 | 9/2014 | Hearn | |
| 2014/0263237 A1 | 9/2014 | Daniel | |
| 2014/0263241 A1 | 9/2014 | Henry | |
| 2015/0021379 A1 | 1/2015 | Albrecht | |
| 2015/0076119 A1 | 3/2015 | Hsu | |
| 2015/0105898 A1 | 4/2015 | Adams | |
| 2016/0067919 A1 * | 3/2016 | Hoyt | E04C 3/28 264/308 |

FOREIGN PATENT DOCUMENTS

| | | |
|---|---|---|
| CN | 2125475 | 12/1992 |
| CN | 1593829 | 3/2005 |

(56) References Cited

FOREIGN PATENT DOCUMENTS

| | | |
|---|---|---|
| CN | 1597193 | 3/2005 |
| CN | 1792513 | 6/2006 |
| CN | 101185986 | 5/2008 |
| CN | 101392371 | 3/2009 |
| CN | 101491856 | 7/2009 |
| CN | 201644997 | 11/2010 |
| CN | 103056367 | 4/2013 |
| DE | 102013217317 | 3/2015 |
| JP | H04127970 | 4/1992 |
| JP | H07252630 | 10/1995 |
| JP | 2001138059 | 5/2001 |
| JP | 2003010970 | 1/2003 |
| WO | 2012121086 | 9/2012 |

OTHER PUBLICATIONS

International Search Report from PCT application No. PCT/US2014/046769, dated Dec. 5, 2014, 11 pgs.
"Tattoo Machine", http://en.wikipedia.org/wiki/Tattoo_machine [accessed Apr. 7, 2017].
International Search Report from PCT application No. PCT/US2016/061381, dated Jan. 24, 2017.
Painful Pleasures, Help Center, "Coil vs. Rotary Tattoo Machines", http://info.painfulpleasures.com/help-center/information-center/coil-vs-rotary-tattoo-machines [accessed Apr. 7, 2017].
Kapustka, Nick, "Achieving Higher Productivity Rates Using Reciprocating Wire Feed Gas Metal Arc Welding," Welding Journal, Apr. 2015, pp. 70-74.

\* cited by examiner

ADDITIVE MANUFACTURING HEATING CONTROL SYSTEMS AND METHODS

CROSS REFERENCE TO RELATED APPLICATIONS

This application claims priority from and the benefit of U.S. Provisional Application Ser. No. 61/846,935, entitled "ADDITIVE MANUFACTURING SYSTEM FOR JOINING AND SURFACE OVERLAY," filed Jul. 16, 2013, which is hereby incorporated by reference in its entirety for all purposes.

BACKGROUND

The invention relates generally to additive manufacturing, and more particularly, to additive manufacturing anchors for joining different materials and for forming surface overlays.

Various manufactured products may incorporate components with different materials. As may be appreciated, the different materials of the manufactured products may be joined together by fasteners, mating geometries, welding, or other processes. Fasteners or complementary geometries may add components or weight to the joint. Heat input from welding components together may form a heat affected zone (HAZ) that affects properties of the joint, such as the strength or fatigue life. Undesirable phases or intermetallic structures may form from mixing incompatible base materials into a weld. Direct manufacturing (DM) processes may build up materials with an electron beam in a vacuum chamber. However, the vacuum chamber and electron beam may reduce the availability of DM processes for some products.

BRIEF DESCRIPTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment, an additive manufacturing system includes an additive manufacturing tool configured to supply a plurality of droplets to a part, a temperature control device configured to control a temperature of the part, and a controller configured to control the composition, formation, and application of each droplet to the plurality of droplets to the part independent from control of the temperature of the part via the temperature control device. The plurality of droplets is configured to build up the part. Each droplet of the plurality of droplets includes at least one metallic anchoring material.

In another embodiment, a method of additively forming a part includes controlling a temperature of the part via a temperature control device coupled to the part, and forming a plurality of droplets, wherein each droplet of the plurality of droplets includes at least one of a plurality of metallic anchoring materials. The method also includes determining a desired deposition location on the part for each droplet of the plurality of droplets based at least in part on a predetermined set of instructions for the part, and depositing each droplet of the plurality of droplets to the part at the respective desired deposition location.

In another embodiment, an additive manufacturing system includes one or more feeders, an additive manufacturing tool, a temperature control device, and a controller. The one or more feeders are configured to supply a plurality of metallic anchoring materials to the additive manufacturing tool, which is configured build up a part with a plurality of micro-deposits. The additive manufacturing tool is configured to form each micro-deposit of the plurality of micro-deposits from a respective droplet, and the respective droplet includes one or more metallic anchoring materials of the plurality of metallic anchoring materials. The temperature control device includes a heating element and is configured to heat the part. The controller is configured to independently control the temperature control device and the composition of the respective droplet of each micro-deposit of the plurality of micro-deposits.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
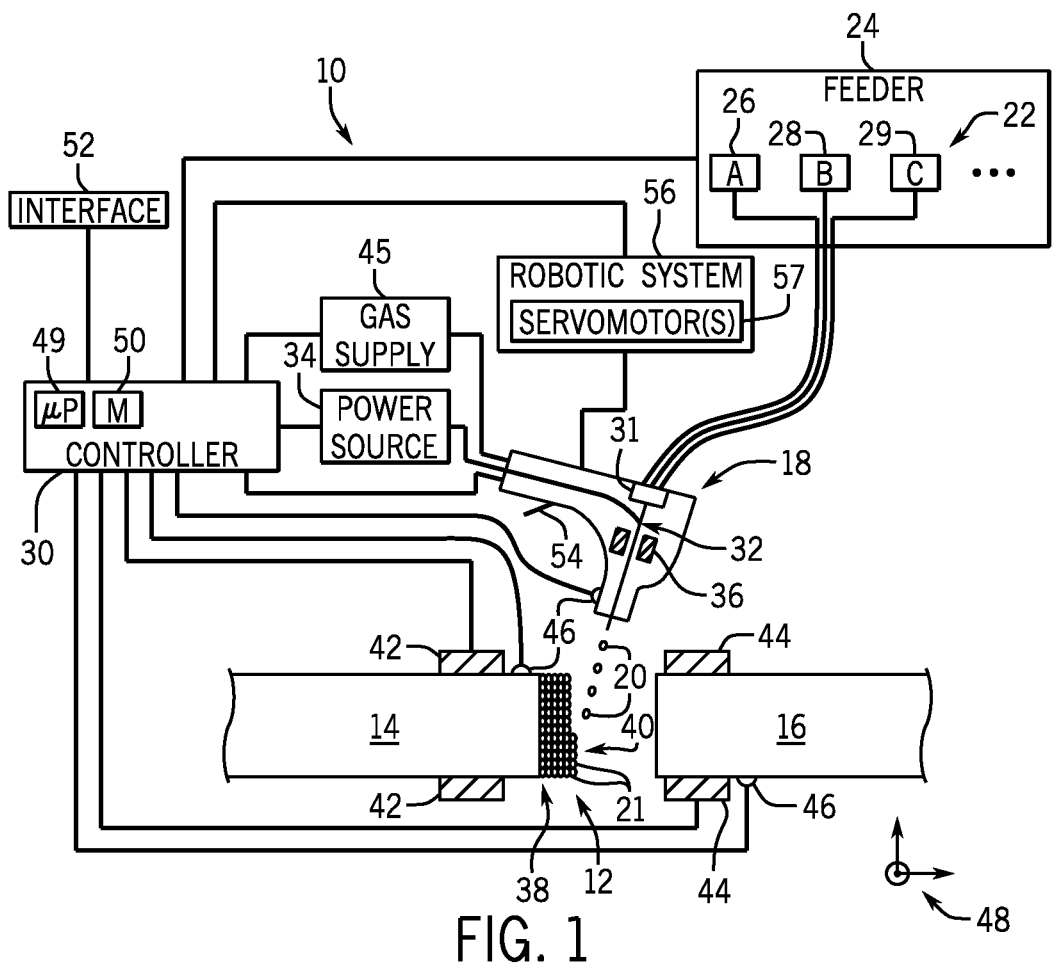
FIG. 1 is a diagram of an embodiment of an additive manufacturing system and a part.

Turning to FIG. 1, an embodiment of an additive manufacturing system 10 additively forms (e.g., prints, builds) a part 12 from one or more anchoring materials 22. The additively formed part 12 may be a first work piece 14, a second work piece 16, or a joint between the first work piece 14 and the second work piece 16, or any combination thereof. In some embodiments, the first and second work pieces 14, 16 may be of different materials having significantly different physical properties. For example, in one embodiment, the first work piece 14 may be aluminum and the second work piece 16 may be steel. An additive manufacturing tool 18 deposits multiple droplets 20 to form (e.g., print, build) the part 12 of the one or more anchoring materials 22. In some embodiments, the additive manufacturing tool 18 deposits the droplets 20 between the first and second work pieces 14, 16. As described in detail below, the additive manufacturing tool 18 may utilize one or more types of energy to form and deposit the droplets 20 to form the part 12. The one or more types of energy utilized by the additive manufacturing tool 18 may include, but are not limited to, an electric power output, photonic energy (e.g., laser), or any combination thereof. Where the part 12 is a joint between the first and second work pieces 14, 16, the additive manufacturing tool 18 utilizes the energy to join the first and second work pieces 14, 16 via the part 12.

Figure 2:
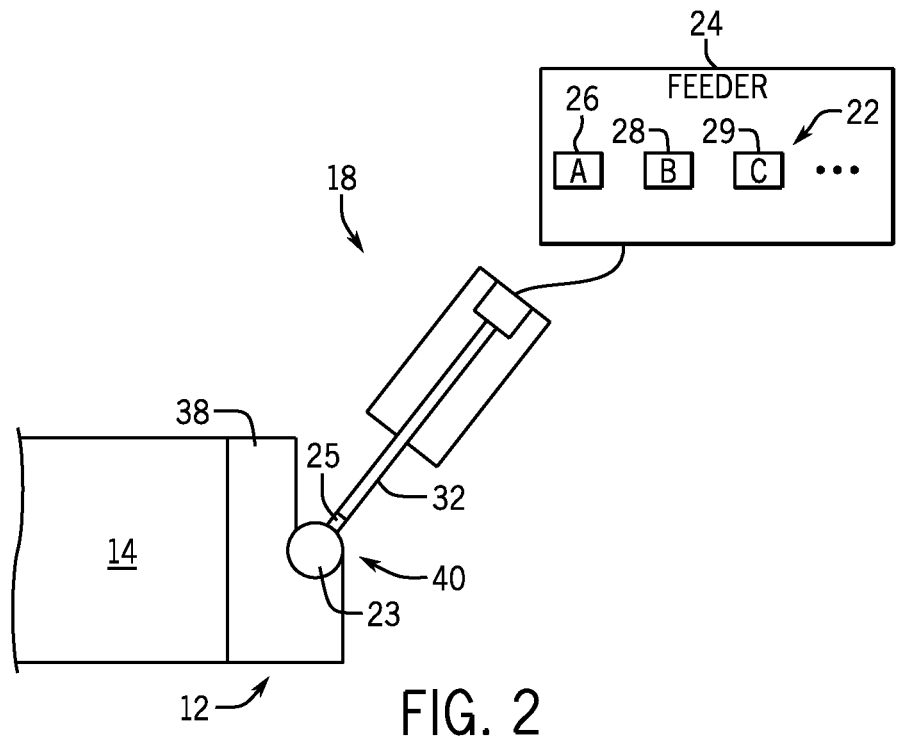
FIG. 2 is a diagram of an embodiment of the additive manufacturing system and a part.

The additive manufacturing tool 18 heats the one or more anchor materials 22 from a feeder 24 to form the droplets 20 having a desired composition. In some embodiments, a mixer 31 of the additive manufacturing tool 18 is configured to receive and to combine the one or more anchor materials 22 from the feeder 24. For example, the mixer 31 may combine the multiple anchor materials 22 into an electrode 32 having a desired combination of the anchor materials 22. In some embodiments, the mixer 31 may form a powder mixture of the multiple anchor materials 22. The electrode 32 and/or the powder mixture may be formed into droplets 20. The one or more anchor materials 22 are metallic materials that include, but are not limited, to aluminum alloys, steel alloys, aluminum, iron, copper, manganese, silicon, magnesium, zinc, chromium, titanium, molybdenum, and nickel. As discussed herein, the droplets 20 are units of material transfer. Each droplet 20 may become a "micro-deposit" when solidified, and the part 12 is formed from multiple micro-deposits 21. FIG. 2 illustrates an embodiment of the additive manufacturing tool 18 that directs the anchor material 22 (e.g., electrode 32) into a molten puddle 23 of micro-deposits 21 to form the part 12. The anchor material 22 may be at approximately ambient temperature or a preheated temperature when inserted into the puddle 23. A portion 25 (e.g., ball) of the anchor material 22 is melted by the puddle 23, thereby forming a micro-deposit 21 of the part 12 without forming a defined droplet 20. For example, the preheated portion 25 of the anchor material 22 may join the puddle 23, thereby forming the micro-deposit 21 of the part 12 via a hot-wire welding process. As may be appreciated, the puddle 23 may be a recently formed section of the part 12 that has not yet solidified. The energy applied to the puddle 23 melt the portion 25 may include, but is not limited, to resistance heating, photonic (laser) energy, or inductive heating.

Returning to FIG. 1, the one or more anchor materials 22 may include, but are not limited to, powders, solid wires, cored wires, tubular wires, or coated wires, or any combination thereof. In some embodiments, a first anchor material 26 may be substantially the material of the first work piece 14, and a second anchor material 28 may be substantially the material of the second work piece 16. In other words, the first and second anchor materials 26, 28 may have chemical compositions that are substantially similar or compatible to the respective first and second work pieces 14, 16. For example, the first anchor material 26 may have only minor differences (e.g., elemental components varying by only fractions of compositional percentages, different alloys from the same alloy family) relative to the material of the first work piece 14. In some embodiments, anchoring materials 22 may include, but are not limited to, brazing or soldering materials with lower melting temperatures than the materials of the first work piece 14 and/or the second work piece 16. Anchor materials 22 with a lower melting temperature than the first or second work pieces 14, 16 may enable layers of micro-deposits 21 adjacent to the first or second materials 14, 16 to not melt when the one or more anchoring materials 22 is applied. Some embodiments of the additive manufacturing system 10 may include more than two anchoring materials 22, such as 3, 4, 5, 6, 7, 8, 9, 10, or more anchoring materials 22. For example, a third anchor material 29 may be supplied to the additive manufacturing tool 18. The third anchor material 29 may have a chemical composition that is substantially similar to the material of the first work piece 14 or to the material of the second work piece 16. Additionally, or in the alternative, the third anchor material 29 may have a chemical composition that is an alloying material that provides a desired property (e.g., adhesion, increased or decreased fluidity) between the first and second anchoring materials 26, 28, and/or the chemical composition of the third anchor material 29 may provide a desired property (e.g., strength, hardness, galvanic protection) to the part 12.

A controller 30 of the additive manufacturing system 10 controls the application of the droplets 20 to form the part (e.g., anchor) 12 from the micro-deposits 21. In some embodiments with wired anchor materials 22, the controller 30 controls the composition of the droplets 20 applied to the part 12 by adjusting the relative quantities of the one or more anchor materials 22 supplied to the mixer 31 of the additive manufacturing tool 18, which thereby forms the electrode 32. For example, where the first anchor material 26 is substantially similar to or compatible with the material of the first work piece, the controller 30 may increase the relative ratio of the first anchor material 26 in the electrode 32 to form (e.g., print) portions of the part 12 near the first work piece 14. As discussed herein, the composition of each droplet 20 is based on the one or more anchor materials 22 that make up the respective droplet 20. The droplets 20 are liquid (e.g., molten) at least in part. In some embodiments, a droplet 20 may be a liquid anchor material 22 encapsulating a solid element of the same or a different anchor material 22. For example, the additive manufacturing tool 18 may at least partially melt only an outer layer of a droplet 20.

The additive manufacturing tool 18 may mix (e.g., melts, sinters, compresses) multiple anchor materials 22 with the mixer 31 into an electrode 32 with a mixed composition. The controller 30 may control the additive manufacturing tool 18 to form droplets 20 with the mixed composition from the mixed electrode 32. The controller 30 may adjust the composition of the part (e.g., anchor) 12 by varying ratios of the one or more anchor materials 22 in the mixed electrode 32. In some embodiments, the additive manufacturing tool 18 supplies each of the one or more anchor materials 22 as a separate electrode 32 that the additive manufacturing tool 18 respectively forms into droplets 20. For example, the controller 30 may control the additive manufacturing tool 18 to form separate droplets 20 with different respective compositions from each of the multiple electrodes 32. The controller 30 may adjust the composition of the part 12 by varying ratios of the one or more anchor materials 22 applied as droplets 20 to the part 12.

Figure 3:
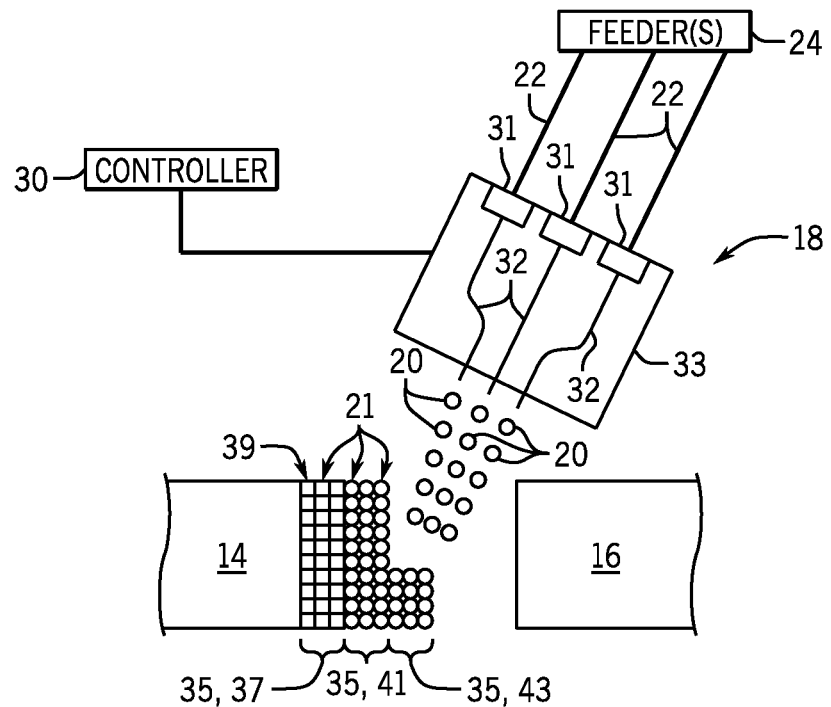
FIG. 3 is a diagram of an embodiment of the additive manufacturing system with an integrated tool head.

In some embodiments, the controller 30 is coupled to multiple additive manufacturing tools 18, each supplying a separate anchor material 22 via a respective electrode. The controller 30 may control each of the multiple additive manufacturing tools 18 to adjust the composition of the part 12 by varying ratios of the anchor materials 22 supplied as droplets 20 by each additive manufacturing tool 18. As illustrated in FIG. 3, multiple wire delivery systems (e.g., feeders 24) may be combined an integrated tool head 33 of the manufacturing tool to supply multiple anchor materials 22 in rows or a grid. The integrated tool head 33 may increase the deposition rate of the anchor materials 22 to form (e.g., print, build up) the part 12. The integrated tool head 33 of the additive manufacturing tool 18 may have multiple mixers 31 to receive and process the anchor materials 22 into electrodes 32 and/or powder streams. The controller 30 may control each mixer 31 so that each electrode 32 and/or powder stream has the same composition. In some embodiments, the controller 30 controls one or more mixers 31 so that the respective electrode 32 or powder stream has a different composition than the electrode 32 or powder stream from another mixer 31. The integrated tool head 33 may enable the additive manufacturing tool 18 to form multiple layers 35 of the part at approximately the same time, thereby enabling a reduction of production time for the part 12 by reducing a quantity of passes of the additive manufacturing tool 18 to form the part 12. A first layer 37 of the part 12 formed of substantially solidified micro-deposits 21 is illustrated with a grid 39. The micro-deposits 21 of a second layer 41 of the part 12 formed between the first layer 37 and a third layer 43 may be less solidified than the micro-deposits 21 of the first layer 37, yet sufficiently solidified to support and bond with the deposited droplets 20 of the third layer 43. The controller 30 controls the deposition rate of the droplets 20 and the rate of formation of the layers 35 by the additive manufacturing tool 18 to enable each layer to bond with the previously formed layer 35. For example, the controller 30 may decrease the deposition rate or rate of layer formation as the additive manufacturing tool 18 builds up the part 12.

Returning again to FIG. 1, the controller 30 controls a power source 34 to adjust the power output (e.g., current output, voltage output, photonic energy) provided to the additive manufacturing tool 18 to melt the one or more anchor materials 22 into the droplets 20. As may be appreciated, the power source 34 may include, but is not limited to, an engine-driven generator, a welding power supply, an inverter, laser, or any combination thereof. The controller 30 may control the power source 34 to provide a DC or AC power output to the electrode 32 in a controlled waveform, similar to a pulsed welding process or a short circuit welding process (e.g., regulated metal deposition (RMD™)). In some embodiments, the controller 30 controls the power source 34 to provide power output to the electrode 32 via the additive manufacturing tool 18 to enable a modified short circuit welding process (e.g., controlled short circuit) to form the part 12. Additionally, the controller 30 facilitates formation of the part 12 by controlling the additive manufacturing tool 18 to extend and retract the one or more electrodes 32 during a controlled short circuit welding process. The power output provided to the additive manufacturing tool 18 melts the electrode 32 into the droplets 20, which are deposited via the arc to the part 12 as micro-deposits 21. That is, in some embodiments, the electrode 32 is a welding wire, the additive manufacturing tool 18 is a welding torch configured for a pulsed welding process or a short circuit welding process, and the feeder 24 is a welding wire feeder. The welding torch may layer micro-deposits 21 via the arc, thereby forming (e.g., building up, printing) the part 12 from welding wire via a pulsed welding process and/or a short circuit welding process (e.g., RMD). As may be appreciated, some embodiments of the additive manufacturing system 10 may include a gas supply 45 configured to provide one or more shielding gases to the additive manufacturing tool 18. The one or more shielding gases may include, but are not limited to, argon, carbon dioxide, helium, nitrogen, hydrogen, and combinations thereof.

As discussed above, the controller 30 may control power output for processes utilizing electrical arc and/or photonic energy to heat the electrode 32. The controller 30 may control the rate at which the droplets 20 are applied to the part 12 by controlling the power source 34. In some embodiments, the controller 30 controls a heating device 36 (e.g., inductor coil, resistance heater) to preheat the electrode 32. Accordingly, the controller 30 may control the heat applied to the electrode 32 to form the droplets 20. Additionally, or in the alternative, the heating devices 36, 42, 44 may enable pre-heating or post-heating of the electrode 32, the first work piece 14, and/or the second work piece 16 respectively. Preheating the electrode 32 may reduce the heat applied to the first and second work pieces 14, 16, thereby reducing the formation of a heat affected zone.

The droplets 20 added to the part 12 as micro-deposits 21 affect the heat added to the first work piece 14 and the second work piece 16. As discussed herein, the formation of the micro-deposits 21 may include, but is not limited to, heating the anchor material 22 (e.g., electrode 32) to form the droplet 20, and cooling the micro-deposit 21 in the part 12. As may be appreciated, the heat of the droplet 20 and the cooling rate of the micro-deposit may affect the microstructure of the micro-deposit 21 formed by the respective droplet 20, thereby affecting the properties of the part 12. For example, the microstructure of the micro-deposits 21 of the part 12 at a first location 38 may be different than the microstructure of the micro-deposits 21 at a second location 40. Additionally, as discussed herein, the application of each droplet 20 to the part 12 may include, but is not limited to, the application rate of droplets 20 to the part 12 and the application location on the part 12 of each micro-deposit 21. The controller 30 may control the temperature of the droplets 20, the application (e.g., deposition) rate, and the application location of each droplet 20 to control the heat applied to the work pieces 14, 16. For example, the controller 30 may reduce the inducement of a heat affected zone (HAZ) that may affect the microstructure and properties (e.g., strength, fatigue life) of the work pieces 14, 16 proximate to the part 12. The temperature, deposition rate, and application location of the droplets 20 in the part 12 affects the heat added to the first work piece 14 and the second work piece 16. For example, an arc at 2000° C. adds more heat to the part 12 than an arc at 1200° C. As may be appreciated, high deposition rates (e.g., 60 Hz) of droplets 20 may add less heat to the part 12 than relatively lower deposition rates (e.g., 30 Hz) of droplets 20. Additionally, droplets 20 applied at the first location 38 on the first work piece 14 add more heat to the first work piece 14 than droplets 20 applied at the second location 40 on the first work piece 14. In some embodiments, the controller 30 controls the heating device 36 to affect the application temperature of the micro-deposits 21 in the part 12 to affect the heat added to the first work piece 14 and the second work piece 16. The controller 30 may control the feeder 24 and/or the mixer 31 to control the application rate, and the controller 30 may control the power source 34 to control the application rate and the application temperature of the droplets 20 as the micro-deposits in the part 12. In some embodiments, a robotic system 56 coupled to the additive manufacturing tool 18 may control the application location of the droplets 20 by moving the additive manufacturing tool 18 along coordinate axes 48 via one or more servomotors 57.

In a similar manner to controlling the heat applied to the work pieces 14, 16, the controller 30 may control the temperature of the droplets 20, the application rate, and the application location of each droplet 20 to control the heat applied to previously applied micro-deposits 21. For example, the application rate and the temperature of the droplets 20 may affect the cooling rate and microstructure of previously applied micro-deposits 21. The controller 30 may control the application rate and the temperature of the droplets 20 to achieve a desired microstructure for each of the micro-deposits 21 utilized to form the part 12. Accordingly, the controller may control the composition and/or the microstructure of the micro-deposits 21 of the part 12.

In some embodiments, a first heating device 42 may heat the first work piece 14 near the part 12, and/or a second heating device 44 may heat the second work piece 16 near the part 12 (e.g., joint). The first and second heating devices 42, 44 may include, but are not limited to, inductor coils, resistance heaters, flames, and so forth. The first and second heating devices 42, 44 may interface with one or more surfaces of the respective first and second work pieces 14, 16. For example, the first heating device 42 may extend around the first work piece 14. The controller 30 may control the first heating device 42 and/or the second heating device 44 to preheat the respective work pieces 14, 16 near the part 12. As may be appreciated, preheating a work piece 14, 16 may affect the adhesion to micro-deposits 21 from the additive manufacturing tool 18. For example, increasing the temperature of the first work piece 14 may increase the adhesion of the micro-deposits 21 at the first location 38. In some embodiments, the controller 30 independently controls the first and second heating devices 42, 44, thereby enabling the first work piece 14 to be preheated to a different temperature than the second work piece 16.

As discussed previously, the first work piece 14 may be different from the second work piece 16. For example, the first work piece 14 may be aluminum and the second work piece 16 may be steel. In some embodiments, the first and second work pieces 14, 16 may be the same or different compositions with the same base metal (e.g., aluminum, titanium, iron, galvanized-coated material, high strength steel). For example, the first work piece 14 may be a nickel coated steel, and the second work piece 16 may be a relatively high-carbon steel. The first work piece 14 may have different properties and/or structure than the second work piece 16. For example, the melting temperature, thermal conductivity, and strength, among other properties, may differ between the first work piece 14 and the second work piece 16. Additionally, or in the alternative, the first work piece 14 and the second work piece 16 may have different sensitivities to heat. For example, the first work piece 14 may be annealed at a melting temperature of the second work piece 16. Accordingly, annealing the first work piece 16 (e.g., by heating it to the melting temperature of the second work piece 16) may affect properties (e.g., strength, fatigue-life) of the first work piece 16.

As may be appreciated, the heat affected zone (HAZ) of a metal may be defined herein as the area of the metal in which the properties and/or microstructure of the metal has been affected by heat. In some embodiments, the controller 30 may independently control the heat applied to the electrode 32, the heat applied to the first work piece 14 (e.g., via the first heating device 42), and the heat applied to the second work piece 16 (e.g., via the second heating device 44). Through independent control of the heat applied to these components, the additive manufacturing system 10 may reduce the HAZ of the first work piece 14 and/or the second work piece 16. For example, if the first work piece 14 is aluminum and the second work piece 16 is a steel with a higher melting temperature than the first work piece 14, the controller 30 may control the additive manufacturing tool 18 to apply the droplets 20 near the second work piece 16 (e.g., steel) with more heat and/or at a higher rate than the droplets 20 near the first work piece 14 (e.g., aluminum).

The controller 30 may control the composition and the formation of each of the droplets 20 applied to build the part 12 with micro-deposits 21 as the additive manufacturing tool 18 moves between the first work piece 14 and the second work piece 16. In this way, the additive manufacturing system 10 may control the composition and structure (e.g., spatial distribution of the micro-deposits 21) of the part 12 to have a desired set of properties while controlling the HAZ of the first and/or second work pieces 14, 16. Sensors 46 may measure the temperature and cooling rate of the electrode 32, the first work piece 14, and/or the second work piece 16. Feedback from the sensors 46 may be stored as temperature history of the electrode 32, the first work piece 14, and/or the second work piece 16. The controller 30 may use this temperature history to control the composition and structure of the part 12. In some embodiments, the sensors 46 may measure the position of the additive manufacturing tool 18, first work piece 14, and second work piece 16 relative to the set of coordinate axes 48. The controller 30 may control the application of the droplets 20 to the part 12 based at least in part on the relative distance from the first work piece 14 and/or the second work piece 16. For example, in some applications the part 12 may be formed to have a gradient composition of the first and second anchor materials 26, 28, such that the composition of the part 12 adjacent to the first work piece 14 is compatible (e.g., forming a strong bond) with the first work piece 14, and the composition of the part 12 adjacent to the second work piece 16 is compatible (e.g., forming a strong bond) with the second work piece 16.

The controller 30 may independently control the thermal cycle, peak temperature, and cooling rates of each of the micro-deposits 21 based at least in part on the application location in the part 12. The controller 30 may independently control the composition and the formation of each of the droplets 20 for the application location according to a set of instructions (e.g., code) executed by a processor 49. The processor 49 may load the set of instructions from a memory 50 based at least in part on the work pieces 14, 16 and the anchor materials 22. In some embodiments, an operator (e.g., host computer) may provide the set of instructions directly to the controller 30 via an operator interface 52. For example, the operator may load a set of instructions for forming the part 12 from a three-dimensional model (e.g., computer aided design (CAD) model) of the anchor produced by a three-dimensional 3D CAD tool. In some embodiments, the controller 30 may receive and/or produce a set of instructions to produce the part 12 with a desired composition of anchor materials 22. For example, the controller 30 may utilize a 3D CAD model of the part 12 to control the robotic system 56 to produce the part 12 from the anchor materials 22. Additionally, or in the alternative, an operator may input information about the work pieces 14, 16 and the anchor materials 22 into the operator interface 52, and the controller 30 may determine and/or modify the set of instructions to form the part 12 with desired characteristics. The set of instructions directs the controller 30 to control the composition, formation, and application of each droplet 20 as a micro-deposit 21 to form the part 12 with desired characteristics.

The controller 30 may use input from the sensors 46 to individually control each droplet 20 applied to the part 12 as a micro-deposit 21. In some embodiments, the controller 30 may adapt the set of instructions based at least in part on the input from the sensors 46 to compensate for changes to the first work piece 14, the second work piece 16, or the part 12. For example, the controller 30 may adapt the application location and/or the heating of the droplets 20 during the formation of the part 12 if the input from the sensors 46 indicates a change in the fit-up of a joint between the first work piece 14 and the second work piece 16. Additionally, or in the alternative, the controller 30 may adapt the application and/or the heating of the droplets if the input from the sensors 46 indicates a deflection or burn through of the first work piece 14 and/or the second work piece 16. The controller 30 may adapt the temperature of the first work piece 14 and/or the temperature of the second work piece 16 (e.g., via the heating devices 42, 44) during the formation of the part 12 if the input from the sensors 46 indicates a deflection or burn through of the first work piece 14 and/or the second work piece 16.

The additive manufacturing system 10 may build the part 12 between the first work piece 14 and the second work piece 16 by manual or automatic movement of the additive manufacturing tool 18. In some embodiments, the droplets 20 may be deposited via the arc (e.g. spray) as shown in FIG. 1. In some embodiments as illustrated in FIG. 2, the electrode 32 contacts the work piece and/or part 12, and the additive manufacturing tool 18 applies the respective micro-deposits 21 via short circuit. In some embodiments, an operator begins or resumes building the part 12 by actuating a trigger 54. The controller 30 determines a location of the additive manufacturing tool 18 relative to the work pieces 14, 16 via the sensors 46, and the controller 30 determines the application location of the micro-deposits 21 prior to formation of the droplets 20 of the desired composition according to the set of instructions. In some embodiments, the robotic system 56 controls the movement of the additive manufacturing tool 18 along the coordinate axes 48, such as via servomotors 57. The controller 30 may control the robotic system 56 with the set of instructions to move the additive manufacturing tool 18 to apply the controlled droplets 20 as micro-deposits 21 to respective locations in the part 12 based on the set of instructions. The robotic system 56 thereby enables the controller 30 to automatically form parts 12 with a desired composition and geometry. In some embodiments, the robotic system 56 may form (e.g., print, build up) the parts 12 from the one or more anchor materials 22 separate from the work pieces 14, 16. The formed parts 12 may later be joined with the work pieces 14, 16.

Figure 4:
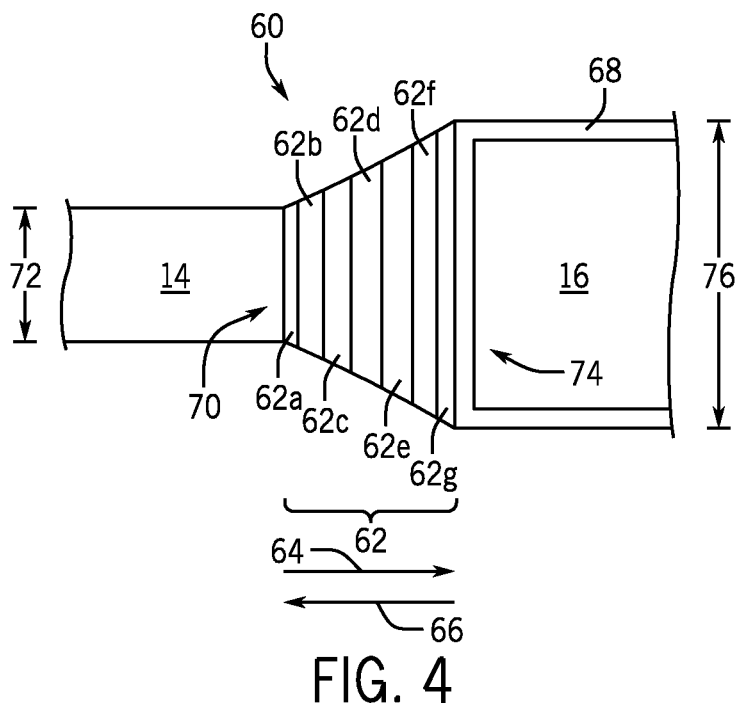
FIG. 4 is a diagram of an embodiment of a joint between different materials formed by the additive manufacturing system of FIG. 1.

FIG. 4 illustrates an embodiment of a joint 60 that may be formed by the additive manufacturing system 10 described above. The joint 60 has multiple layers 62 that connect the first work piece 14 to the second work piece 16. In some embodiments, the material of each layer 62 may differ from the adjacent layers 62. For example, the embodiment of the joint 60 of FIG. 4 has seven layers (e.g., layers 62a, 62b, 62c, 62d, 62e, 62f, 62g) between the first work piece 14 and the second work piece 16. The first layer 62a may be a material more compatible with the first work piece 14 than the second layer 62b, or a solder or braze filler that does not melt the first work piece 14. The seventh layer 62g may be a material more compatible with the second work piece 16 than the sixth layer 62f, or a solder or braze filler that does not melt the second work piece 16. If the first work piece 14 is aluminum and the second work piece 16 is a steel alloy, the layers 62 in a first direction 64 may have progressively less aluminum or "aluminum-friendly" material, and the layers in a second direction 66 may have progressively less steel or "steel-friendly" material. As may be appreciated, a "friendly" anchoring material 22 may be a material that is substantially the same material as the base material and/or forms a bond of desired strength determined by the operator based on the joint. Additionally, or in the alternative, several layers with specific compositions and structures based at least in part on the composition or microstructure of the respective first and second work pieces 14, 16 may transition from the first work piece 14 to the second work piece 16. In some embodiments, the joint 60 may be formed with less than seven layers 62 (e.g., 1, 2, 3, 4, 5, or 6 layers) of different compositions, or with more than seven layers 62 (e.g., 8, 9, 10, 15, 20, or 50 or more layers) of different compositions.

In some embodiments, the first and/or second work pieces 14, 16 may have a coating 68, such as a corrosion resistant coating (e.g., zinc), wear resistant coating, and so forth. The controller 30 may control the composition and application of the layers 62 so that the joint 60 does not remove or substantially affect the coating 68 of a work piece proximate to the joint 60. For example, if the second work piece 16 is galvanized steel with a zinc coating 68, the seventh layer 62g may have zinc or a "zinc-friendly" material (e.g., silicon bronze) as an anchoring material, and the droplets 20 for the seventh layer 62g may be applied without substantially removing, melting, or affecting the corrosion-resistance of the zinc coating 68.

During application of the layers 62, the additive manufacturing system 10 may independently control the application of heat to the work pieces and the joint 60 to reduce the melting and/or the HAZ from each layer 62, as discussed above. In some embodiments, the controller 30 may control the additive manufacturing system 10 so that the application of the interior layers (e.g., layers 62b, 62c, 62d, 62e, and 62f) does not substantially produce an HAZ in the first work piece 14 and/or the second work piece 16. That is, only the first layer 62a may heat and at least partially fuse or bond with the first work piece 14, and/or only the seventh layer 62g may heat and at least partially fuse or bond with the second work piece 16. Additionally, or in the alternative, the controller 30 may control the penetration of the droplets 20 into the work piece 14, 16.

In some embodiments, the additive manufacturing system 10 may adjust the geometry and composition of the layers 62 applied to build the joint 60. For example, a first end 70 of the first work piece 14 may have a first width 72, and a second end 74 of the second work piece 16 may have a second width 76 that is different from the first width 72. The controller 30 may apply the droplets 20 as micro-deposits 21 to form layers 62 that have widths between the first width 72 and the second width 76. As may be appreciated, the controller 30 may form the joint 60 with a geometry that provides a desired level of strength. For example, a curved geometry (e.g., fillet) or tapered geometry (as shown) of the joint 60 may reduce stresses in the joint 60 relative to a perpendicular joint geometry 60.

Figure 5:
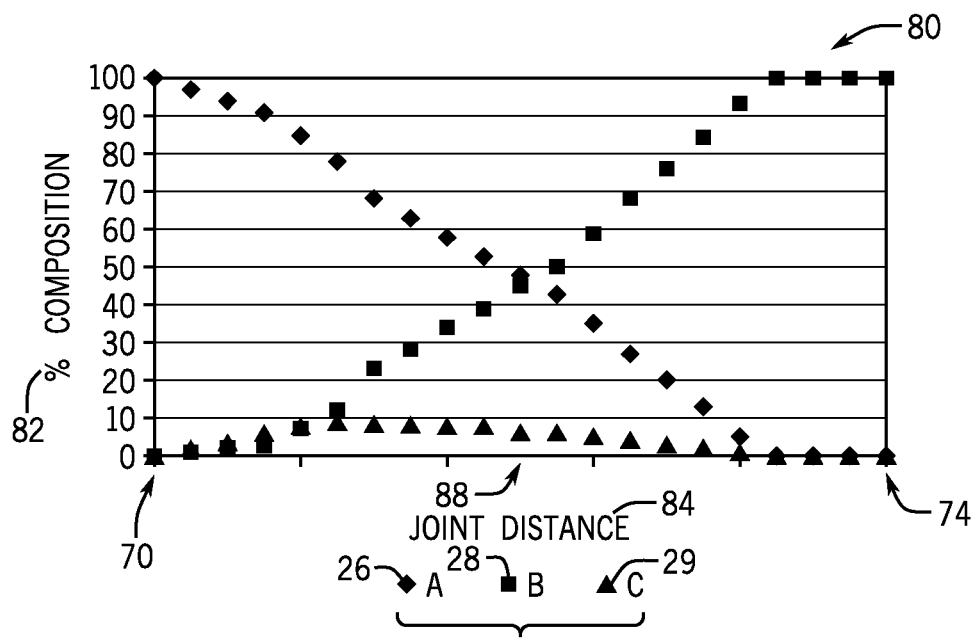
FIG. 5 is a chart illustrating an exemplary material composition of a joint formed by the additive manufacturing system of FIG. 1.

FIG. 5 illustrates a chart 80 of an exemplary joint composition between the first work piece 14 and the second work piece 16. The controller 30 may control the composition of each of the micro-deposits 21 forming the joint 60, thereby controlling the properties (e.g., adhesion to work piece, strength, corrosion resistance) of the joint 60. As discussed above, in some embodiments the controller 30 may control the composition of each of the droplets 20 via a mixed electrode 32. The mixed electrode 32 may be formed from one or more anchoring materials 22. The composition of each of the droplets may be controlled via controlling the composition of the mixed electrode 32. That is, a droplet 20 may be formed of one or more anchor materials 22. Additionally, or in the alternative, the controller 30 controls the composition of each of the droplets 20 via forming separate droplets from one or more electrodes 32, where each of the one or more electrodes 32 may be a different anchor material 22. The controller 30 may selectively control the composition of the joint 60 by controlling a ratio of the droplets 20 from each electrode 32 applied to the joint 60. That is, each droplet 20 may be a distinct anchor material 22, and the joint 60 is formed from separate micro-deposits 21 of different anchor materials 22 with desired ratios. The embodiment illustrated by chart 80 shows the percent composition 82 of the joint 60 with respect to the distance 84 from the first end 70 of the first work piece 14 to the second end 74 of the second work piece 16. The joint 60 of chart 80 has three anchoring materials 22: the first anchoring material 26, the second anchoring material 28, and a third anchoring material 29. Some embodiments of the joint 60 may have more or less than three anchoring materials 22.

The controller 30 controls the composition and/or location of each of the droplets 20 applied to the joint 60 as micro-deposits 21. At the first end 70, the joint 60 is substantially compatible with the first work piece 14 (e.g., the first anchoring material 26). In some embodiments, the material of the joint 60 at the first end 70 is substantially the same as the material of the first work piece 14. As the distance 84 increases towards the second end 74 of the second work piece 16, the percentage of the first anchoring material 26 in the joint 60 decreases, and the percentage of the second anchoring material 28 (e.g., the second work piece 16) increases. In some embodiments, the percentage of the first anchoring material 26 in the joint 60 has an inverse relationship with the distance 84 from the first end 70, and the percentage of the second anchoring material 28 in the joint 60 has a direct relationship with the distance 84 from the first end 70. In some embodiments, the material of the joint 60 at the second end 74 is substantially the same as the material of the second work piece 16. The relationships of the anchoring materials 22 in the joint 60 with respect to the distance 84 from the first end 70 may include, but are not limited to, linear, exponential, logarithmic, or any combination thereof. In some embodiments, the percentage of the first anchoring material 26 in the joint 60 may be approximately equal to the percentage of the second anchoring material 28 at a middle portion 88 of the joint 60. However, other embodiments of the joint 60 may have different relative percentages of the first anchoring material 26 and the second anchoring material 28 throughout the joint 60. In some embodiments, the percentage of the third anchoring material 29 in the joint 60 may be greater proximate to the first work piece 14 than proximate to the second work piece 16. For example, the third anchor material 29 may affect the adhesion or other properties of the first and second anchor materials 26, 28 in layers 62 with a majority of the first anchor material 26. In some embodiments, the third anchor material 29 is more compatible with the first anchor material 26 than the second anchor material 28. As may be appreciated, the additive manufacturing system 10 may form each layer 62 of the joint 60 between the first and second work pieces 14, 16 with a variety of different compositions of anchoring materials 22.

While FIG. 5 illustrates a relatively gradual change of composition of the joint 60 between the first end 70 of the first work piece 14 and the second end 74 of the second work piece 16, some embodiments of the joint 60 may include a step transition of composition. The transition for the joint 60 may be selected based at least in part on the resulting material properties (e.g., strength, thermal expansion) and/or economic factors (e.g., material cost, manufacturing time, manufacturing cost). For example, the layer adjacent to the first end 70 may be primarily the first material 26, the layer adjacent to the second end 74 may be primarily the second material 28, and the one or more layers between the first and second ends 74 may be primarily the third material 29.

Figure 6:
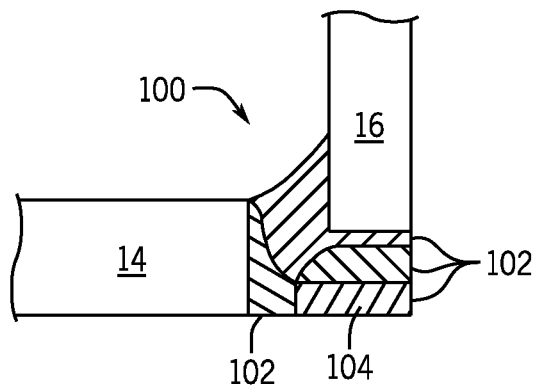
FIG. 6 is a cross-section of an embodiment of a joint between different materials formed by the additive manufacturing system of FIG. 1.

FIG. 6 illustrates an embodiment of a joint 100 between the first work piece 14 and the second work piece 16. In some embodiments, the additive manufacturing system 10 may form the joint 100 with regions 102 having different compositions of anchoring materials 22 in place of, or in addition to, the layers 62 described above with FIG. 2. The additive manufacturing system 10 may determine the composition and geometry of each region 102 to provide the joint 100 with a desired set of properties. For example, non-linear regions 102 of varying cross-sectional geometries may be more resistant to shear stresses on the joint 100 than the joint 60 with multiple linear layers 62.

In some embodiments, connecting the first work piece 14 to the second work piece 16 may increase the corrosion potential if the work pieces 14, 16 have different electric potentials. The additive manufacturing system 10 may deposit the anchoring materials 22 to provide galvanic protection, thereby reducing the corrosion of the first and/or second work pieces 14, 16. For example, the additive manufacturing system 10 may form a sacrificial anode 104 in the joint 100. In some embodiments, the sacrificial anode 104 may be the first anchoring material 26, the second anchoring material 28, or a third anchoring material 29. The anchoring material of the sacrificial anode 104 may be a different anchoring material than a remainder of the joint 100. As may be appreciated, the sacrificial anode 104 formed in the joint 100 may provide corrosion protection to the first and/or second work pieces 14, 16, and/or the structural load bearing portion of the joint 100.

Figure 7:
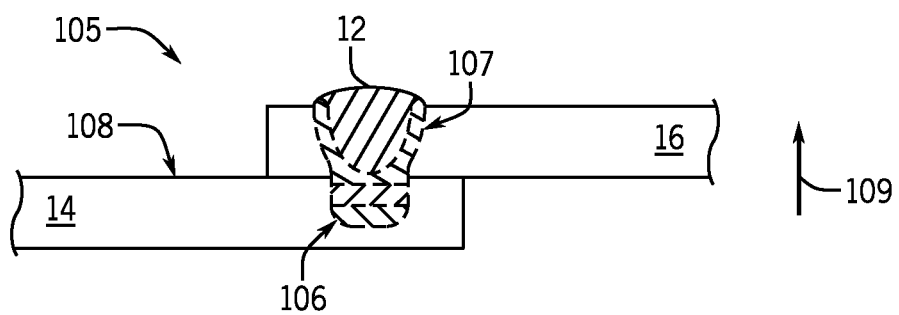
FIG. 7 is a cross-section of an embodiment of a joint between different materials formed by the additive manufacturing system of FIG. 1.

FIG. 7 illustrates an embodiment of the part 12 in a joint 105 (e.g., lap joint) between the first and second work pieces 14, 16. The first work piece 14 may have a first recess 106, and a second recess 107 (e.g., hole) of the second work piece 16 may be positioned near the first recess 106. The first recess 106 and the second recess 107 may or may not have the same shape. For example, the first recess 106 may be a channel in a top surface 108 of the first material 14, and the second recess 107 may be a hole through the second material 16. In some embodiments, the first work piece 14 may not have the first recess 106, and only the second material 16 has the second recess 107. The additive manufacturing system 10 may form the part 12 (e.g., printed fastener) by layering micro-deposits 21 to build up (e.g., print) the one or more anchoring materials 22 through the second material 16 in the direction shown by arrow 109. In some embodiments, the part 12 has a layered structure similar to the joint 60 of FIG. 4, or the part 12 has the non-linear structure similar to the joint 100 of FIG. 6. Moreover, the part 12 may be formed (e.g., printed) from one anchoring material 22, such as an anchoring material (e.g., aluminum) that is the same or compatible material with the material (e.g., aluminum alloy) of the first work piece 14.

Figure 8:
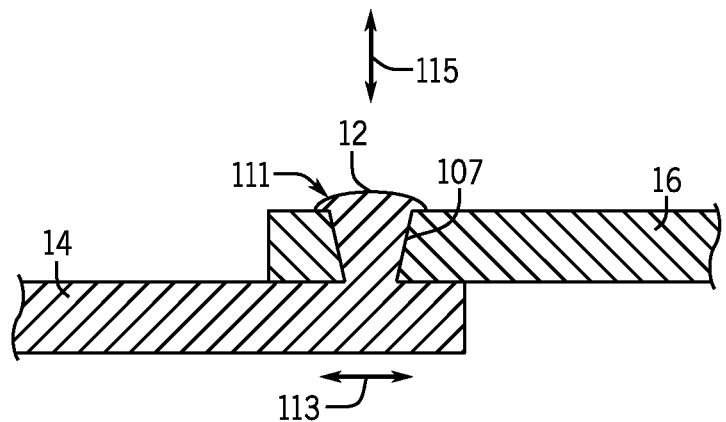
FIG. 8 is a cross-section of an embodiment of a joint between different materials formed by the additive manufacturing system of FIG. 1.

FIG. 8 illustrates a cross-sectional view of an embodiment of the part 12 between the first and second work pieces 14, 16. In some embodiments, the part 12 may be a lap joint 105, a T-joint, butt joint, corner joint, or edge joint between the first and second work pieces 14, 16. In some embodiments, the part 12 is a plug coupled (e.g., fused) to the first work piece 14 within the second recess 107 (e.g., slot, hole) of the second work piece 16. The additive manufacturing system 10 may form the part 12 by layering micro-deposits 21 on the first work piece 14 and within the second recess 107 of the second work piece 16, where the anchor material 22 used for the part 12 is substantially the first work piece 14 and/or an anchoring material "friendly" to the first work piece 14. For example, the additive manufacturing system 10 may additively form (e.g., build up, print) an aluminum part 12 on an aluminum first work piece 14 and within a second recess 107 of a steel second work piece 16. The part 12 may be integrally formed (e.g., welded, fused, or melted) with the first work piece 14 by the additive manufacturing tool 18, but not welded, fused, or melted with the second work piece 16. The part 12 may be built up (e.g., printed, additively manufactured) to the first work piece 14 to form a mating geometry to interface with the second work piece 16. That is, the part 12 may merely interface with at least a portion of the second recess 107 of the second work piece 16 rather than fusing with a portion of the second recess 107. The additive material 22 of the part 12 may not penetrate the surface of the second work piece 16. In this way, the part 12 may join the first work piece 14 to the second work piece 16 without melting the second work piece 16 of the second recess 107, thereby reducing the energy used to join the first work piece 14 to the second work piece 16. Accordingly, the part 12 may resist shear forces between the first and the second work pieces 14, 16 across the joint 105 as shown by the arrows 113. In some embodiments, the additive manufacturing system 10 may form a flange 111 on the part 12 that retains the interface between the first and second work pieces 14, 16. The flange 111 may be a cap that resists separating forces (e.g., arrows 115) between the first and the second work pieces 14, 16.

In some embodiments, the additive manufacturing tool 18 may form (e.g., build up, print) parts to form joints between coated components. For example, a joint portion (e.g., end portion) of the second work piece 16 (e.g., steel) may be coated, brazed, and/or clad with the first work piece 14 (e.g., aluminum). In some embodiments, the additive manufacturing tool 18 may additively form the coating of the first work piece 14 on the second work piece 16. The additive manufacturing tool 18 may build up the part 12 by integrally forming (e.g., printing, welding, melting, fusing) the additive anchoring material 22 to the coating of the first work piece 14. In some embodiments, the additive manufacturing tool 18 integrally forms the part 12 with the coating of the first work piece 14 and with another component of the same material as the coating. For example, the additive manufacturing tool 18 may be used to form an aluminum anchor on an aluminum-coated steel work piece, where the aluminum anchor is fused with an aluminum component. In some embodiments, the additive manufacturing tool 18 integrally forms the part with the coating of a work piece (e.g., first work piece 14), where the printed part 12 interfaces (e.g., mates) with another work piece (e.g., the second work piece 16) of the material different from the coating, like the part 12 shown in FIG. 8. For example, the additive manufacturing tool 18 may be used to form an aluminum part (e.g., fastener) on an aluminum-coated steel component, where the aluminum part interfaces with a recess (e.g., hole) of a steel component. As may be appreciated, aluminum melts at a lower temperature than steel. Accordingly, forming an aluminum part on an aluminum-coated steel enables a joint to be formed between the aluminum-coated steel component and another component (e.g., steel, aluminum, etc.) without melting steel of the joint. Integrally forming the part 12 with the coating may reduce the energy used to join different materials.

Figure 9:
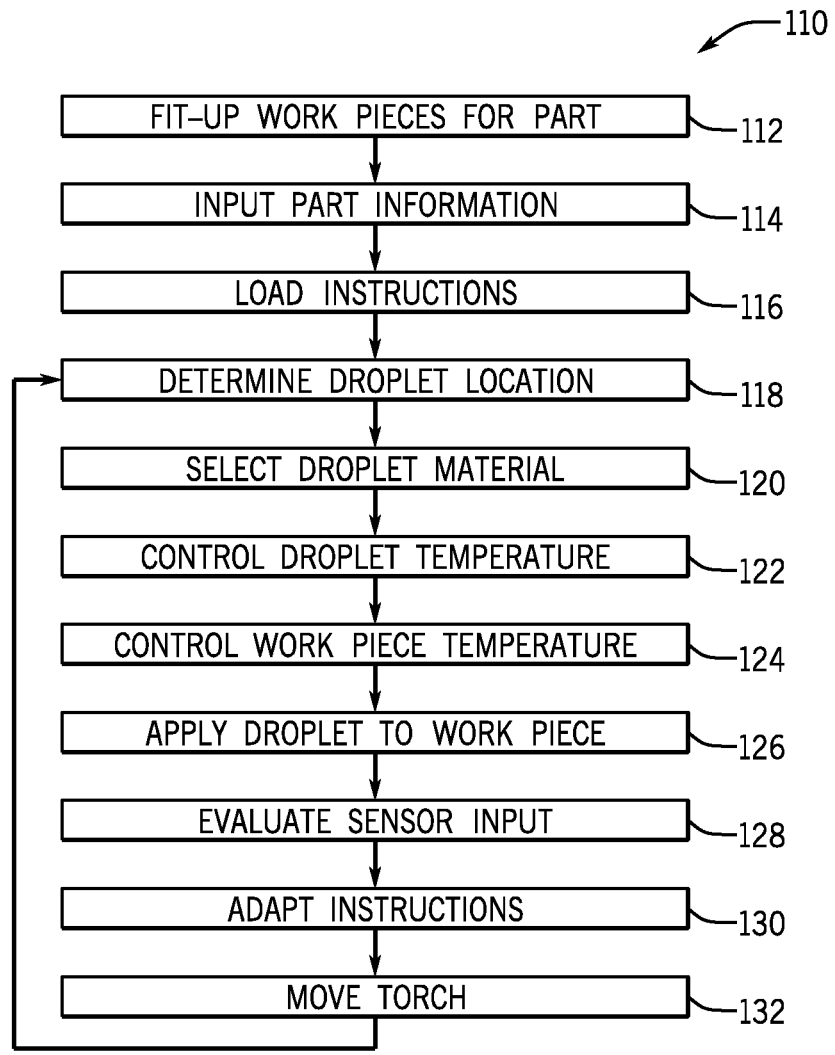
FIG. 9 is a flow chart of an embodiment for a method of additively forming a part.

FIG. 9 illustrates an embodiment of a method 110 for the additive manufacturing system 10 to form the part 12, where the part 12 is a joint (e.g., anchor) between the first work piece 14 and the second work piece 16. The work pieces 14, 16 are first fit up (block 112) for the joint. An operator may input (block 114) the part information into the additive manufacturing system 10, such as via the operator interface 52. For example, the operator may input one or more of the material of the first work piece 14, the material of the second work piece 16, the available anchoring materials 22, the type of joint (e.g., butt, lap, tee, edge, corner), and the joint geometry. The controller 30 loads (block 116) instructions for the part 12 (e.g., joint) based at least in part on the supplied part information. In some embodiments, the instructions are robotic instructions produced by an offline programming tool. The instructions may be based at least in part on a 3D model of the part 12 produced by a CAD tool. The controller 30 may utilize the robotic system 56 to form the part 12.

The controller 30 controls the formation and application of each droplet 20 to form the part (e.g., joint) between the work pieces 14, 16 with micro-deposits 21. Prior to deposition of each droplet 20, the controller 30 determines (block 118) the deposition location for the droplet 20 as the micro-deposits 21. The deposition location may be directly on one of the work pieces and/or on a previous microdeposit 21. The controller 30 selects (block 120) the one or more anchor materials 22 used to form the droplet 20. As described above, one or more anchor materials 22 may be provided to the additive manufacturing tool 18 as a one or more electrodes 32 in wired or powdered forms based at least in part on the loaded instructions. In some embodiments the additive manufacturing tool 18 may mix (e.g., melt, sinter, compress) multiple anchor materials 22 into a mixed electrode 32 or a mixed powder, which is formed into droplets 20. In some embodiments, the additive manufacturing tool 18 may have multiple electrodes 32 of different anchoring materials 22. The controller 30 selects (block 120) which electrode 32 to form the droplet 20 based at least in part on the loaded instructions. The controller 30 may direct the additive manufacturing tool 18 to heat the electrode 32 to form a droplet 20 and controls (block 122) the heating of the droplet 20 to be applied to form the part 12. The controller 30 controls the heating of the droplet 20 via controlling the power output supplied to the electrode 32 for the arc. In some embodiments, the controller 30 controls preheating of the electrode 32, such as via an induction heater, resistance heater, and/or laser in or around the additive manufacturing tool 18.

The controller 30 may control (block 124) the heating of the work pieces independent from controlling (block 122) the heating of the anchoring materials 22. Heating devices 42, 44 on the first and/or the second work pieces 14, 16 may be controlled to preheat the respective material 14, 16 proximate to the part (e.g., joint). The controller 30 controls the additive manufacturing system 10 to apply (block 126)

the droplet 20 with the desired composition at the determined deposition location when the work piece is at the desired temperature. After the droplet 20 is deposited as a micro-deposit 21, the controller 30 may receive and evaluate (block 128) sensor inputs regarding components of the additive manufacturing system 10. For example, the controller 30 may determine the respective temperature histories and/or relative locations of the work pieces and the part from the sensors 46. Based at least in part on the sensor inputs, the controller 30 may adapt (block 130) the set of instructions for position changes of the work pieces and/or of the part, such as due to thermal effects. In some embodiments, the controller 30 may increase the deposition rate of the droplets 20 utilized to form the part to reduce the heat input to the work pieces 14, 16. The controller 30 or operator may move (block 132) the additive manufacturing tool 18 and repeat blocks 118-128 until the part (e.g., joint) is complete.

While some of the embodiments described above utilize the additive manufacturing system 10 to form a joint between a first work piece 14 of a first material and a second work piece 16 of a second material with one or more anchoring materials 22, it will be appreciated that the additive manufacturing system 10 may build the first work piece from a first anchoring material and/or may build the second work piece from a second anchoring material. That is, the additive manufacturing system 10 may build up (e.g., print) a component, such as a work piece, with one or more anchoring materials 22 without forming the joint at the same time. For example, the additive manufacturing system 10 may build up the first work piece 14 in a first direct manufacturing (DM) process, build up the second work piece 16 in a second DM process, and build up a part (e.g., joint) between the first work piece 14 and the second work piece 16 in a third DM process. The first, second, and third DM processes may be formed at the same or different worksites. For example, the additive manufacturing system 10 may build up the first work piece 14 at a first worksite, the additive manufacturing system 10 may build up the second work piece 16 at a second worksite, and the additive manufacturing system 10 may form the part (e.g., joint) at yet a third worksite. In some embodiments, the additive manufacturing system 10 may produce via additive manufacturing one or more work pieces and the respective part 12 (e.g., anchor, joint) therebetween. In some embodiments, the additive manufacturing system 10 may produce the part 12 at the first end 70 of the first work piece 14 without connecting the open end of the part 12 to the second work piece 16. The additive manufacturing system 10 may form the part 12 with the open end of the part 12 configured to later be connected (e.g., via welding) to the second work piece 16. In this way, the additive manufacturing system 10 may facilitate connecting the first work piece 14 of a first material to the second work piece 16 of a different second material.

Figure 10:
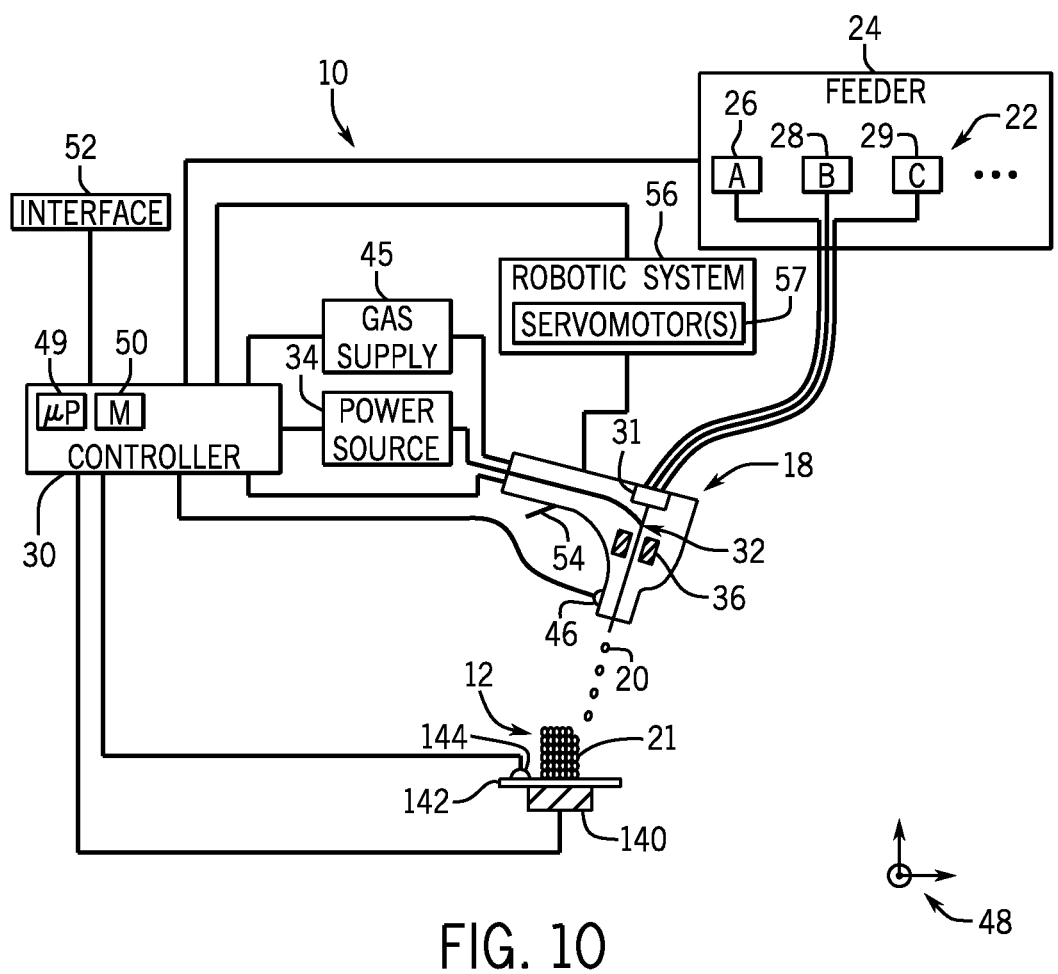
FIG. 10 is a diagram of an embodiment of the additive manufacturing system and a part.

FIG. 10 illustrates an embodiment of the additive manufacturing system 10 that forms (e.g., builds up) the part 12 independent of the first work piece 14 and the second work piece 16, as described above. A temperature control device 140 may be proximate to or coupled to the part 12 during at least a portion of the additive manufacturing process that forms the part 12. In some embodiments, the part 12 is formed on a substrate 142, and the temperature control device 140 is coupled to the substrate 142. The part 12 may be removed (e.g., cut, machined) from the substrate 142 upon completion of the part 12. The substrate 142 may facilitate the formation of the part 12 by providing a surface for the deposition of one or more initial layers of micro-deposits 21. The substrate 142 may include, but is not limited to a material that is "friendly" to the anchoring material 22 of the applied droplets 20 utilized to form the part 12. That is, the material of the substrate 142 may have the same base material (e.g., aluminum, iron) as the base material of the anchoring material 22 of the applied droplets 20. For example, when the anchoring material 22 of the part 12 is an aluminum alloy, the material of the substrate 142 may be an aluminum alloy. Also, when the anchoring material 22 of the part 12 is a ferrous material, the material of the substrate 142 may be a ferrous material (e.g., iron, stainless steel, carbon steel, spring steel).

The temperature control device 140 may be utilized to control the temperature of the part 12 during the additive manufacturing process. In some embodiments, the temperature control device 140 preheats part 12 prior to the addition of one or more layers of micro-deposits 21. For example, the temperature control device 140 may preheat the part 12 via preheating the substrate 142. Additionally, or in the alternative, the temperature control device 140 may control a cooling rate of the part 12 after the droplets 20 have been applied as micro-deposits 21. For example, the temperature control device 140 may control the cooling rate of the part 12 to have a desired microstructure, such as via a substantially uniform microstructure via annealing the part 12. That is, the controller 30 may control the temperature control device 140 to gradually reduce the heat applied to the part 12 over a period of time. In some embodiments, the temperature control device 140 may have a heating element, such as an inductor coil, a resistance heater, a flame, or a laser, or any combination thereof. The temperature control device 140 may apply heat to the part 12 via conduction, radiation, or any combination thereof. The controller 30 may utilize temperature feedback from a sensor 144 positioned on previously deposited micro-deposits 21, the substrate 142, or the temperature control device 140 to control the temperature of the part 12.

Additionally or in the alternative to a heating element of the temperature control device 140, the temperature control device 140 may include a cooling element, such as a cooling coil, a fan, or any combination thereof. For example, a cooling coil may circulate a refrigerant or a cooled fluid (e.g., air, water, oil) to transfer heat received from the part 12 by the temperature control device 140 to a heat sink. The controller 30 may control the temperature control device 140 to cool the part 12 during formation of the part 12, such as to facilitate an increased deposition rate of the droplets 20, to obtain a desired microstructure of the micro-deposits 21, or any combination thereof. In some embodiments, the controller 30 may control the temperature control device 140 to rapidly cool (e.g., quench) the applied droplets 20 to obtain a desired microstructure of the micro-deposits 21 of the part 12.

The controller 30 may control (e.g., heat, cool) the temperature of the part 12 via the temperature control device 140 during and after formation of the part 12 by the additive manufacturing tool 18 of the additive manufacturing system 10. In some embodiments, the controller 30 may control the temperature of the substrate 142 via the temperature control device 140 prior to formation of the part 12. The controller 30 may control the temperature control device 140 independent from the one or more heating devices 36 of the additive manufacturing tool 18. That is, the controller 30 may control the additive manufacturing tool 18 to control the composition of the droplets, the formation (e.g., temperature, shape, rate) of the droplets 20, and deposition location of the droplets 20, and the controller 30 may control the temperature control device 140 to control the cooling rate of the micro-deposits 21 of the part 12.

As discussed above with FIG. 1, the heating devices 42, 44 may enable pre-heating or post-heating of the first work piece 14, the second work piece 16, or any combination thereof. As may be appreciated, each of the heating devices 42, 44 may be a temperature control device 140, as described above with FIG. 10. Accordingly, the heating devices 42, 44 illustrated in FIG. 1 may also have cooling elements to control the pre-cooling or post-cooling of the first work piece 14 and/or the second work piece 16. Additionally, or in the alternative, separate cooling elements (e.g., temperature control devices 140) may be used with the heating devices 42, 44 coupled to the first work piece 14 and the second work piece 16.

The additive manufacturing system may be utilized to form metallic layers for various purposes, including joining dissimilar materials. In some embodiments, the additive manufacturing system may form a corrosion-resistive and/or wear-resistive overlay on a fabricated component. The additive manufacturing system may have the flexibility to adapt metallic components with layers for various geometries and/or to provide metallurgical features for a desired performance. Moreover, the additive manufacturing system may be utilized to build up (e.g., print) components with one or more anchoring materials in a process similar to welding.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An additive manufacturing system, comprising:
   an additive manufacturing tool comprising a mixer configured to receive and process at least one metallic anchoring material from a feeder to form one or more electrodes;
   a power source configured to selectively provide DC or AC power output to the electrode in a controlled waveform to melt the electrode into a plurality of droplets to build up a part;
   a temperature control device configured to control a temperature of the part at least by selectively applying heat to the part to control a cooling rate of the part; and
   a controller comprising executable instructions that, when executed, cause the controller to control the feeder, the mixer, the power source, and the temperature control device, wherein the controller is configured to control at least one of composition, formation, and individual application of each droplet of the plurality of droplets to the part independent from control of the temperature of the part via the temperature control device, such that the plurality of droplets builds up the part.

2. The system of claim 1, comprising a substrate coupled to the temperature control device and to the part, wherein the substrate comprises a material compatible with the at least one metallic anchoring material, and the additive manufacturing tool is configured to supply the plurality of droplets to the substrate to form the part.

3. The system of claim 2, wherein the temperature control device is configured to preheat the substrate prior to formation of the part.

4. The system of claim 1, wherein the controller is configured to control a robotic system to move the additive manufacturing tool relative to the part, and the controller is configured to control a deposition location of each droplet of the plurality of droplets, and the deposition location comprises a location on the part where the respective droplet is deposited.

5. The system of claim 1, wherein the temperature control device comprises an inductive coil, a resistance heater, or any combination thereof, and the temperature control device is configured to heat the part.

6. The system of claim 1, wherein the temperature control device comprises at least one of a cooling coil or a fan, and the temperature control device is configured to cool the part.

7. The system of claim 1, wherein the temperature control device comprises a heating element and a cooling element.

8. An additive manufacturing system comprising:
   one or more feeders configured to supply a plurality of metallic anchoring materials to an additive manufacturing tool that comprises a mixer configured to receive and process the plurality of metallic anchoring material from a feeder to form an electrode;
   a power source configured to selectively provide DC or AC power output to the electrode in a controlled waveform to melt the electrode into a plurality of droplets to build up a part with a plurality of micro-deposits, wherein the additive manufacturing tool is configured to form each micro-deposit of the plurality of micro-deposits from a respective droplet, and the respective droplet comprises one or more metallic anchoring materials of the plurality of metallic anchoring materials;
   a temperature control device comprising a heating element, wherein the temperature control device is configured to heat the part and control a cooling rate of the part at least by selectively applying heat to the part; and
   a controller comprising executable instructions that, when executed, cause the controller to control the feeder, the mixer, the power source, and the temperature control device, composition of the respective droplet of each micro-deposit of the plurality of micro-deposits, and an individual application of the respective droplet of each micro-deposit of the plurality of micro-deposits with the additive manufacturing tool, such that the plurality of micro-deposits builds up the part.

9. The system of claim 8, wherein the additive manufacturing tool comprises a welding torch, and the welding torch is configured to form the respective droplets by applying a controlled waveform welding power output to the one or more metallic anchoring materials of the plurality of metallic anchoring materials.

10. The system of claim 8, wherein the temperature control device comprises a cooling element, and the controller is configured to control the temperature control device to control a cooling rate of the part.

11. The system of claim 8, comprising a substrate coupled to the temperature control device and to the part, wherein the additive manufacturing tool is configured to build up the part on the substrate, and the temperature control device is configured to heat the part via heating the substrate.

12. The system of claim 11, comprising a sensor coupled to the substrate and configured to provide temperature feedback to the controller.

13. The system of claim 1, wherein the executable instructions, when executed, cause the controller to select one or more wires based on a location of deposition of a droplet, the one or more wires comprising one or more of a plurality of metallic anchoring materials, the plurality of metallic anchoring materials comprising the at least one metallic anchoring material.

14. The system of claim 1, wherein the additive manufacturing tool comprises a welding torch, and the welding torch is configured to form the respective droplets by applying a controlled waveform welding power output to the one or more metallic anchoring materials of the plurality of metallic anchoring materials.

15. The system of claim 14, wherein the controlled waveform welding power output comprises at least one of a controlled short circuit waveform or a regulated metal deposition waveform.

16. The system of claim 9, wherein the controlled waveform welding power output comprises at least one of a controlled short circuit waveform or a regulated metal deposition waveform.

17. The system of claim 8, wherein the plurality of metallic anchoring materials comprising respective wires, each of the wires composed of one or more of the plurality of metallic anchoring materials, and the executable instructions, when executed, cause the controller to control the composition of each micro-deposit by selecting one or more of the wires based on a location of the micro-deposit and controlling the one or more feeders based on the selected wires.

* * * * *